(12) United States Patent
Dang et al.

(10) Patent No.: US 7,935,740 B2
(45) Date of Patent: May 3, 2011

(54) PROCESS FOR PRODUCING HIGH MELT STRENGTH POLYPROPYLENE

(75) Inventors: Vu A. Dang, Bear, DE (US); Dinshong Dong, Hockessin, DE (US); Theodore Dziemianowicz, Bryn Mawr, PA (US)

(73) Assignee: Basell Poliolefine Italia s.r.l., Milan (IT)

( * ) Notice: Subject to any disclaimer, the term of this patent is extended or adjusted under 35 U.S.C. 154(b) by 298 days.

(21) Appl. No.: 12/317,875

(22) Filed: Dec. 30, 2008

(65) Prior Publication Data

US 2010/0168267 A1 Jul. 1, 2010

(51) Int. Cl.
*C08F 2/46* (2006.01)

(52) U.S. Cl. .............. 522/157; 522/71; 522/74; 522/76; 522/78; 522/150; 522/158; 522/184; 522/186; 522/912

(58) Field of Classification Search .................... 522/71, 522/74, 78, 76, 149, 150, 157, 158, 184, 522/186, 912
See application file for complete search history.

(56) References Cited

U.S. PATENT DOCUMENTS

| | | | |
|---|---|---|---|
| 4,246,347 A | 1/1981 | Neidleman et al. | |
| 4,785,123 A | 11/1988 | Pennington | |
| 4,883,889 A | 11/1989 | Pennington | |
| 4,885,374 A | 12/1989 | Pennington | |
| 5,047,446 A | 9/1991 | DeNicola, Jr. | |
| 5,200,439 A | 4/1993 | Asanuma | |
| 5,439,949 A | 8/1995 | Lucas et al. | |
| 5,541,236 A * | 7/1996 | DeNicola et al. | 522/157 |
| 5,560,886 A | 10/1996 | Saito et al. | |
| 5,599,956 A | 2/1997 | Pujado et al. | |
| 5,621,155 A | 4/1997 | Benham et al. | |
| 5,623,090 A | 4/1997 | Haruta et al. | |
| 5,804,304 A | 9/1998 | Williams et al. | |
| 5,820,981 A | 10/1998 | Williams et al. | |
| 5,859,265 A | 1/1999 | Müller et al. | |
| 5,883,151 A | 3/1999 | Raetzsch et al. | |
| 5,916,929 A | 6/1999 | Knobel et al. | |
| 5,928,980 A | 7/1999 | Gangwal et al. | |
| 5,973,171 A | 10/1999 | Cochran et al. | |
| 6,180,838 B1 | 1/2001 | Slaugh et al. | |
| 6,194,591 B1 | 2/2001 | Grey et al. | |
| 6,306,970 B1 | 10/2001 | Dang et al. | |
| 6,632,854 B1 | 10/2003 | Charlier | |
| 6,664,317 B2 | 12/2003 | King | |
| 6,677,395 B1 | 1/2004 | Dang et al. | |
| 6,774,156 B2 | 8/2004 | Debras et al. | |
| 6,800,670 B2 | 10/2004 | Shen et al. | |
| 6,867,312 B1 | 3/2005 | Jubin, Jr. et al. | |
| 6,884,898 B1 | 4/2005 | Miller | |
| 6,960,671 B2 | 11/2005 | Cooker et al. | |
| 7,019,044 B2 | 3/2006 | Debras et al. | |
| 7,153,986 B2 | 12/2006 | Abekawa et al. | |
| 7,169,827 B2 | 1/2007 | Debras et al. | |
| 7,448,601 B2 | 11/2008 | Boer et al. | |
| 7,456,231 B2 * | 11/2008 | Jackson et al. | 522/112 |
| 2006/0167128 A1 | 7/2006 | Olivier et al. | |
| 2007/0254965 A1 | 11/2007 | Boer et al. | |
| 2008/0160862 A1 | 7/2008 | Sartori et al. | |

FOREIGN PATENT DOCUMENTS

| | | |
|---|---|---|
| EP | 634441 | 1/1995 |
| EP | 938371 | 9/1999 |
| JP | 8-311273 | 11/1996 |
| JP | 2000-309670 | 11/2000 |
| WO | 00/063287 | 10/2000 |
| WO | 2005/084790 | 9/2005 |
| WO | 2005/094979 | 10/2005 |
| WO | WO 2006075284 A2 * | 7/2006 |
| WO | 2009/003930 | 1/2009 |

* cited by examiner

*Primary Examiner* — Sanza L McClendon

(57) ABSTRACT

The present subject matter relates to processes for irradiating visbroken propylene polymer compositions or extrudates of propylene polymer compositions containing a propylene polymer having a low polydispersity index and a non-phenolic stabilizer.

17 Claims, No Drawings

US 7,935,740 B2

PROCESS FOR PRODUCING HIGH MELT STRENGTH POLYPROPYLENE

FIELD OF THE INVENTION

The present subject matter relates to a process for making high melt strength propylene polymer material. More particularly, the present subject matter relates to a process for making high melt strength propylene polymer material by irradiating low polydispersity index starting material in a reduced oxygen environment.

BACKGROUND OF THE INVENTION

Although conventional propylene polymer materials have long been used in a variety of products and processes, applications such as extrusion coating, blow molding, foam formation, and thermoforming require propylene polymer materials possessing high melt strength. Generally, melt strength in polymers is improved by increasing molecular weight, broadening molecular weight distribution (for a particular molecular weight) and increasing levels of polymer branching. Molecular weight and molecular weight distribution can be modified in the polymerization process itself by choosing particular process conditions and catalyst type. However, typical propylene polymer resins, even those having high molecular weight and broad molecular weight distribution often cannot provide commercially desired levels of melt strength without additional processing. Techniques to improve melt strength have included irradiation of conventional flake polypropylene in reduced-oxygen environments, as described, for example, in U.S. Pat. Nos. 4,916,198, 5,047,485, 5,414,027, 5,541,236, 5,554,668, 5,591,785, 5,731,362, and 5,804,304. These irradiation methods increase propylene polymer melt strength by creating polymer radicals during irradiation which then re-combine to form long-chain branches in the reduced oxygen environment. Irradiation of syndiotactic and atactic metallocene-derived polymers has been described in U.S. Pat. Nos. 5,200,439 and 6,306,970 respectively. Irradiation of material having a Mw/Mn less than 2 generated by fractionation of conventional polypropylene has been described in the Journal of Applied Polymer Science, Vol. 11, pp 705-718 (1967).

Other techniques for improving melt strength include irradiating propylene polymer material in air, such as those described in U.S. Pat. No. 5,439,949, however, the increased oxygen levels favor chain scission reactions at the expense of branching reactions, which requires irradiation doses at or above the gelation point, thereby risking product quality and homogeneity. Irradiating pellets of polymer material in air, as described in U.S. Patent Publication Number 2006/0167128, has been attempted to limit oxygen exposure, however, melt strength may still be adversely affected by chain scission occurring at the outer surface of the pellets.

Phenolic antioxidants have long been used to improve polymer stability under elevated temperature conditions, such as those typically experienced during extrusion, or during extended periods of storage. However, their use in irradiated compositions undermines enhanced melt strength by scavenging free radicals, thereby reducing the number of polymeric free radicals available to recombine to form long-chain branches. Moreover, irradiation of phenolic antioxidant-containing polymers can result in the formation of degradation products that impart undesirable color. Non-phenolic stabilizers have been used in the irradiation of conventional polyolefin materials to avoid such problems, as described in U.S. Pat. No. 6,664,317 and U.S. Provisional Patent Application No. 60/937,649.

A significant challenge associated with production of high melt strength propylene materials via irradiation is the low melt flow rates typically required in the starting material to be irradiated. Low melt flow material (high viscosity) is normally used to ensure that the viscosity after irradiation is still sufficient for the needs of the application, as well as to provide long-chain radicals to help in melt strength development. However, such low melt flow rate material is also more difficult to process in plant equipment, and can result in production loss. Therefore, a continuing need exists for processes that produce irradiated propylene polymers having an improved melt strength/melt flow relationship.

Accordingly, it has unexpectedly been found that improved melt strength, as measured by melt tension, can be obtained by irradiating extrudates of compositions containing propylene polymers having a low polydispersity index and a non-phenolic stabilizer, in reduced oxygen environments. In particular, at equivalent melt flow rates in the irradiated material, superior melt tension values can be obtained. Alternately, for a particular melt tension in the irradiated material, higher melt flow rate starting material can be used.

SUMMARY OF THE INVENTION

In one embodiment, the present subject matter relates to a process comprising:
  irradiating an extrudate comprising a propylene polymer composition with about 1 to about 20 Megarad of radiation to form an irradiated extrudate; the propylene polymer composition being irradiated in a reduced oxygen environment, wherein active oxygen is in an established and maintained concentration of less than about 15% by volume, with respect to a total volume of the reduced oxygen environment;
  maintaining the irradiated extrudate in the reduced oxygen environment for a period of time sufficient for a significant amount of long-chain branches to form within the irradiated extrudate; and
  treating the irradiated extrudate while the irradiated extrudate is in the reduced oxygen environment to substantially deactivate free radicals present in the irradiated extrudate,
  wherein the propylene polymer composition comprises:
  (A) a propylene polymer material having a polydispersity index between 2.1 and 3.4; and
  (B) 0.001 to 1 pph of a non-phenolic stabilizer selected from hindered amines, hydroxylamines, nitrones, amine oxides, benzofuranones, organic phosphites, phosphonites or mixtures thereof, based on the weight of the propylene polymer.

In another embodiment, the present subject matter relates to a process comprising:
  treating a propylene polymer composition with an organic peroxide to form a visbroken product having a polydispersity index between 2.1 and 3.4,
  the propylene polymer composition comprising:
  (A) a propylene polymer; and optionally
  (B) 0.001 to 1 pph of a non-phenolic stabilizer selected from hindered amines, hydroxylamines, nitrones, amine oxides, benzofuranones, organic phosphites, phosphonites or mixtures thereof, based on the weight of the propylene polymer,
  irradiating the visbroken product with about 1 to about 20 Megarad of radiation to form an irradiated, visbroken product; the visbroken product being irradiated in a reduced oxygen environment, wherein active oxygen is in an established and maintained concentration of less than about 15% by volume, with respect to a total volume of the reduced oxygen environment;
  maintaining the irradiated, visbroken product in the reduced oxygen environment for a period of time sufficient for a significant amount of long-chain branches to form within the irradiated propylene polymer composition; and treating the irradiated, visbroken product while the irradiated, visbroken is in the reduced oxygen environment to substantially deactivate free radicals present in the irradiated, visbroken product.

DETAILED DESCRIPTION OF THE INVENTION

Polymer Compositions

The propylene polymer compositions suitable for irradiation include a propylene polymer and a non-phenolic stabilizer. The propylene polymer can be selected from:
(a) a crystalline propylene homopolymer having a xylene insolubles greater than 80%, preferably greater than 85%,
(b) a crystalline random copolymer comprising propylene and an olefin selected from the group consisting of ethylene and a $C_4$-$C_{10}$ α-olefin, having xylene insolubles greater than 80%, preferably greater than 82%, with the proviso that when the α-olefin is ethylene, the crystalline random copolymer comprises a maximum polymerized ethylene content of about 10% by weight, and when the α-olefin is a $C_4$-$C_{10}$ α-olefin, the crystalline random copolymer comprises a maximum polymerized α-olefin content of about 20% by weight,
(c) a crystalline random terpolymer comprising propylene and two olefins selected from the group consisting of ethylene, $C_4$-$C_{10}$ α-olefins, and mixtures thereof with the proviso that the crystalline random terpolymer comprises a maximum polymerized $C_4$-$C_{10}$ α-olefin content of about 20% by weight, and when at least one of the α-olefins is ethylene, the crystalline random terpolymer comprises a maximum polymerized ethylene content of about 5% by weight,
(d) an olefin polymer composition comprising:
  (i) about 10 parts to about 60 parts by weight of a crystalline propylene homopolymer having xylene insolubles of at least 80%, or a crystalline copolymer selected from the group consisting of (a) propylene and ethylene, (b) propylene, ethylene and a $C_4$-$C_{10}$ α-olefin, and (c) propylene and a $C_4$-$C_{10}$ α-olefin, the crystalline copolymer comprising a propylene content of more than about 85% by weight, and xylene insolubles greater than about 60%;
  (ii) about 3 parts to about 25 parts by weight of a copolymer of ethylene and propylene, or ethylene and a $C_4$-$C_{10}$ α-olefin, where the copolymer is insoluble in xylene at ambient temperature; and
  (iii) about 10 parts to about 80 parts by weight of an elastomeric copolymer selected from the group consisting of (a) ethylene and propylene, (b) ethylene, propylene, and a $C_4$-$C_{10}$ α-olefin, and (c) ethylene and a $C_4$-$C_{10}$ α-olefin, the elastomeric copolymer optionally comprising about 0.5% to about 10% by weight of a diene, and comprising less than 70% by weight of ethylene, wherein the elastomeric copolymer is soluble in xylene at ambient temperature and comprises an intrinsic viscosity of about 1.5 to about 4.0 dl/g;
wherein (ii) and (iii) total about 50% to about 90% by weight based on a total weight of the olefin polymer composition, and (ii)/(iii) comprise a weight ratio of less than 0.4; the olefin polymer composition being prepared by polymerization in at least two stages,
(e) a thermoplastic olefin comprising:
  (i) about 10% to about 60% by weight of a propylene homopolymer having xylene insolubles of at least 80%, or a crystalline copolymer selected from the group consisting of (a) ethylene and propylene, (b) ethylene, propylene and a $C_4$-$C_{10}$ α-olefin, and (c) ethylene and a $C_4$-$C_{10}$ α-olefin, the crystalline copolymer comprising a propylene content greater than 85% by weight and xylene insolubles greater than 60%;
  (ii) about 20% to about 60% by weight of an amorphous copolymer selected from the group consisting of (a) ethylene and propylene, (b) ethylene, propylene, and a $C_4$-$C_{10}$ α-olefin, and (c) ethylene and an α-olefin, the amorphous copolymer comprising less than 70% by weight of ethylene and is soluble in xylene at ambient temperature, the amorphous copolymer optionally comprising about 0.5% to about 10% by weight of a diene; and
  (iii) about 3% to about 40% by weight of a copolymer of ethylene and propylene or a copolymer of ethylene and an α-olefin, wherein the copolymer is insoluble in xylene at ambient temperature; and
(f) mixtures thereof.

Preferably, the propylene polymer is selected from a crystalline propylene homopolymer, a crystalline random copolymer of propylene and an olefin selected from the group consisting of ethylene and $C_4$-$C_{10}$ α-olefins or mixtures thereof. More preferably, the propylene polymer is a crystalline propylene homopolymer.

The propylene polymer is preferably isotactic with a triad mm higher than 50% as measured by NMR, and has a molecular weight greater than about 100,000. Typically, the propylene polymer has xylene insolubles greater than 80%, preferably greater than 82%, and more preferably at least 95.0%.

The propylene polymer preferably has a melt flow rate of 0.1 to 100, more preferably 0.15 to 50, most preferably 0.2 to 22.5.

Preferably, the propylene polymer has a polydispersity index between 2.1 and 3.4, more preferably between 2.1 and 2.8, most preferably between 2.1 and 2.3, and a crystallinity higher than 25%, preferably higher than 30%.

The propylene polymers used in the irradiation process can be prepared by Ziegler-Natta or Single-Site (e.g. metallocene) catalysis. When a metallocene Single-Site catalyst is used, a preferred class of metallocene compounds is that of formula (I):

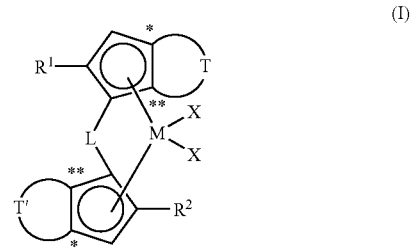

where
M is zirconium, hafnium or titanium,
X are identical or different and are each, independently of one another, hydrogen or halogen or a group —R, —OR, —OSO$_2$CF$_3$, —OCOR, —SR, —NR$_2$ or —PR$_2$, where R is linear or branched $C_1$-$C_{20}$-alkyl, $C_3$-$C_{20}$-cycloalkyl which may bear one or more $C_1$-$C_{10}$-alkyl radicals as substituents, $C_6$-$C_{20}$-aryl, $C_7$-$C_{20}$-alkylaryl or $C_7$-$C_{20}$-arylalkyl and may contain one or more heteroatoms from groups 13-17 of the Periodic Table of the Elements or one or more unsaturated bonds, with the two radicals X also being able to be joined to one another, L is a divalent bridging group selected from the group consisting of $C_1$-$C_{20}$-alkylidene, $C_3$-$C_{20}$-cycloalkylidene, $C_6$-$C_{20}$-arylidene, $C_7$-$C_{20}$-alkylarylidene and $C_7$-$C_{20}$-arylalkylidene radicals which may contain heteroatoms from groups 13-17 of the Periodic Table of the Elements or is a silylidene group having up to 5 silicon atoms, $R^1$ and $R^2$ are identical or different and are each, independently of one another, hydrogen or linear or branched $C_1$-$C_{20}$-alkyl or $C_3$-$C_{20}$-cycloalkyl which may bear one or more $C_1$-$C_{10}$-alkyl radicals as substituents, $C_6$-$C_{20}$-aryl, $C_7$-$C_{40}$-alkylaryl or $C_7$-$C_{40}$-arylalkyl and may contain one or more heteroatoms from groups 13-17 of the Periodic Table of the Elements or one or more unsaturated bonds, T and T' are divalent groups of the formulae (II), (III), (IV), (V), (VI) or (VII):

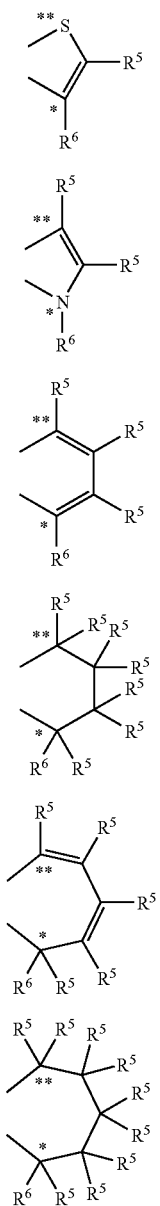

where the atoms denoted by the symbols * and ** are in each case joined to the atoms of the compound of the formula (I) which are denoted by the same symbol, and $R^5$ and $R^6$ are identical or different and are each, independently of one another, hydrogen or halogen or linear or branched $C_1$-$C_{20}$-alkyl or $C_3$-$C_{20}$-cycloalkyl which may bear one or more $C_1$-$C_{10}$-alkyl radicals as substituents, $C_6$-$C_{40}$-aryl, $C_7$-$C_{40}$-alkylaryl or $C_7$-$C_{40}$-arylalkyl and may contain one or more heteroatoms from groups 13-17 of the Periodic Table of the Elements or one or more unsaturated bonds or two radicals $R^5$ or $R^5$ and $R^6$ are joined to one another to form a saturated or unsaturated $C_3$-$C_{20}$ ring.

Among the metallocene compounds of the formula (I), particular preference is given to those in which M is zirconium.

Furthermore, preference is given to metallocene compounds of the formula (I) in which the substituent R in the radicals X is a $C_1$-$C_{10}$-alkyl such as methyl, ethyl, n-propyl, isopropyl, n-butyl, isobutyl, sec-butyl, tert-butyl, n-pentyl, n-hexyl, n-heptyl or n-octyl or $C_3$-$C_{20}$-cycloalkyl such as cyclopentyl or cyclohexyl. Preference is also given to metallocene compounds of the formula (I) in which the two radicals X are joined to one another so as to form a $C_4$-$C_{40}$-dienyl ligand, in particular a 1,3-dienyl ligand, or an —OR'O—, group in which the substituent R' is a divalent group selected from the group consisting of $C_1$-$C_{40}$-alkylidene, $C_6$-$C_{40}$-arylidene, $C_7$-$C_{40}$-alkylarylidene and $C_7$-$C_{40}$-arylalkylidene. X is more preferably a halogen atom or an —R or —OR group, or the two radicals X form an —OR'O— group. X is most preferably chlorine or methyl.

In preferred metallocene compounds of the formula (I), the divalent group L is a radical selected from the group consisting of the silylidenes —SiMe$_2$-, —SiPh$_2$-, —SiPhMe- and —SiMe(SiMe$_3$)- and the alkylidenes —CH$_2$—, —(CH$_2$)$_2$—, —(CH$_2$)$_3$— and —C(CH$_3$)$_2$—.

Preferred radicals R' and $R^2$ in the metallocene compounds of the formula (I) are linear or branched $C_1$-$C_{10}$-alkyl, in particular a linear $C_1$-$C_4$-alkyl group such as methyl, ethyl, n-propyl or n-butyl or a branched $C_3$- or $C_4$-alkyl group such as isopropyl or tert-butyl. In a particularly preferred embodiment, the radicals $R^1$ and $R^2$ are identical and are, in particular, both methyl, ethyl or isopropyl. In a further particularly preferred embodiment, $R^1$ is a linear or branched $C_1$-$C_{10}$-alkyl group which is unbranched in the α position, in particular a linear $C_1$-$C_4$-alkyl group such as methyl, ethyl, n-propyl or n-butyl, and $R^2$ is a $C_3$-$C_{10}$-alkyl group which is branched in the α position, in particular a branched $C_3$- or $C_4$-alkyl group such as isopropyl or tert-butyl.

In preferred metallocene compounds of the formula (I), the radicals $R^5$ are each hydrogen or a linear or branched $C_1$-$C_{10}$-alkyl group, in particular a $C_1$-$C_4$-alkyl group, such as methyl, ethyl, n-propyl, i-propyl or n-butyl, or a $C_3$-$C_{10}$-cycloalkyl group, in particular $C_5$-$C_6$-cycloalkyl, such as cyclopentyl and cyclohexyl, $C_6$-$C_{18}$-aryl, such as phenyl or naphthyl, and $C_7$-$C_{24}$-alkylaryl, such as methylphenyl, ethylphenyl, n-propylphenyl, i-propylphenyl, t-butylphenyl, dimethylphenyl, diethylphenyl, diisopropylphenyl, ditertbutylphenyl, trimethylphenyl, methyl-t-butylphenyl, methylnaphthyl and dimethylnaphthyl, or where two adjacent radicals $R^5$ may be joined to form a 5-7-membered ring.

Furthermore, preference is given to metallocene compounds of the formula (I) in which $R^6$ together with an adjacent radical $R^5$ forms a cyclic system, in particular, an unsaturated 6-membered ring, or $R^6$ is an aryl group of the formula (XI),

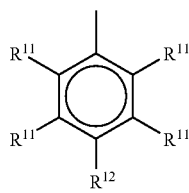

(XI)

where

R$^{11}$ are identical or different and are each, independently of one another, hydrogen or halogen or linear or branched C$_1$-C$_{20}$-alkyl, C$_3$-C$_{20}$-cycloalkyl which may bear one or more C$_1$-C$_{10}$-alkyl radicals as substituents, C$_6$-C$_{20}$-aryl, C$_7$-C$_{20}$-alkylaryl or C$_1$-C$_{20}$-arylalkyl and may contain one or more heteroatoms from groups 13-17 of the Periodic Table of the Elements or one or more unsaturated bonds, or two radicals R$^{11}$ may be joined to form an unsaturated C$_3$-C$_{20}$ ring,
with preference being given to R$^{11}$ being a hydrogen atom, and R$^{12}$ is hydrogen or halogen or linear or branched C$_1$-C$_{20}$-alkyl, C$_3$-C$_{20}$-cycloalkyl which may bear one or more C$_1$-C$_{10}$-alkyl radicals as substituents, C$_6$-C$_{20}$-aryl, C$_7$-C$_{20}$-alkylaryl or C$_7$-C$_{20}$-arylalkyl and may contain one or more heteroatoms from groups 13-17 of the Periodic Table of the Elements or one or more unsaturated bonds, with preference being given to R$^{12}$ being a branched alkyl group of the formula —C(R$^{13}$)$_3$, where R$^{13}$ are identical or different and are each, independently of one another, a linear or branched C$_1$-C$_6$-alkyl group or two or three radicals R$^{13}$ are joined to form one or more ring systems.

Typically, at least one of the groups T and T' is substituted by a radical R$^6$ of the formula (XI). Preferably, both groups T and T' are substituted by such a radical. More preferably, at least one of the groups T and T' is a group of the formula (IV) which is substituted by a radical R$^6$ of the formula (XI) and the other having either the formula (II) or (IV) and likewise being substituted by a radical R$^6$ of the formula (VII). In particular, such metallocene compounds have the formula (XII):

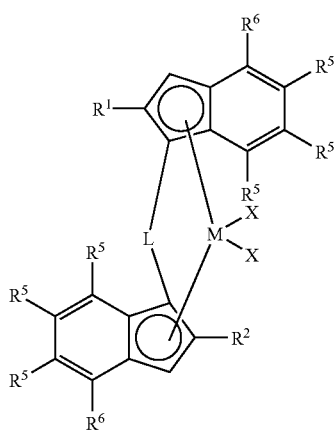

(XII)

Particularly useful metallocene compounds and processes for preparing them are described, for example, in WO 01/48034 and WO 03/045964.

The metallocene compounds of the formula (I) are preferably used in the rac or pseudo-rac form; the term pseudo-rac form refers to complexes in which the two groups T and T' are in the rac arrangement relative to one another when all other substituents of the complex are disregarded.

It is also possible to use mixtures of various metallocene compounds.

The propylene polymers used in the irradiation process can also be prepared in the presence of conventional catalysts of the Ziegler/Natta type comprising the product of the reaction between an aluminium alkyl and a solid component comprising a transition metal supported on MgCl$_2$. In particular, the best results are obtained when using catalysts comprising the product of the reaction between:

(i) a solid component comprising a titanium compound without Ti-π bonds and an electron donor compound (internal donor) supported on a magnesium halide in an active form; and (ii) an Al-alkyl compound and, if appropriate, an electron donor compound (external donor).

The use of an external electron donor compound is generally necessary to obtain propylene polymers having an isotacticity (mm) greater than 80. Nevertheless, if compounds of the type described in Patent EP-A-361,493 are used as internal electron donor compounds, the stereospecificity of the catalyst is by itself sufficiently high and it is not necessary to use an external electron donor compound.

The magnesium halides, preferably MgCl$_2$, in an active form used as support for Ziegler-Natta catalysts are widely known from the patent literature. U.S. Pat. Nos. 4,298,718 and 4,495,338 described for the first time the use of these compounds in Ziegler-Natta catalysis. It is known from these patents that the magnesium halides used in the active form as support or co-support in catalyst components for the polymerization of olefins are characterized by X-ray spectra in which the most intense diffraction line appearing in the spectra of the inactive halide is reduced in intensity and replaced by a halo whose intensity maximum is displaced towards angles which are smaller with respect to that of the most intense line.

The titanium compound is preferably selected from the halides and halogeno-alcoholates. Preferred titanium compounds are TiCl$_4$, TiCl$_3$ and the halogeno-alcoholates of the formula Ti(OR$^1$)$_m$X$_n$ in which R$^1$ is a hydrocarbon radical with 1-12 carbon atoms or a group COR$^1$, X is halogen and (m+n) is the valency of the titanium.

Advantageously, the catalytic component (i) is used in the form of spherical particles having an average diameter of between about 10 and 150 μm. Suitable methods for preparing the components in a spherical form are described, for example, in the Patents EP-A-395,083, EP-A-553,805 and EP-A-553,806, the description of which, relating to the method of preparation and to the characteristics of the products, is incorporated herein by reference.

Suitable internal electron donor compounds include the ethers, esters and in particular the aromatic or aliphatic esters of polycarboxylic acids; the ketones and the 1,3-diethers of the type described in the Patents EP-A-361,493, EP-A-361,494, EP-A-362,705 and EP-A-451,645.

The Al-alkyl compound (ii) is preferably selected from the aluminium trialkyls, such as, for example, Al-triethyl, Al-triisobutyl, Al-tri-n-butyl, Al-tri-n-hexyl and Al-tri-n-octyl. Mixtures of Al-trialkyls with Al-alkyl halides, Al-alkyl hydrides or Al-alkyl sesquichlorides such as AlEt$_2$Cl and Al$_2$Et$_3$Cl$_3$ may also be used.

The external donor can be of the same type as or can differ from the internal donor. If the internal donor is the ester of a polycarboxylic acid, in particular a phthalate, the external donor is preferably selected from the silicon compounds of the formula $R_1R_2Si(OR)_2$, where $R_1$ and $R_2$ are alkyl, cycloalkyl or aryl radicals having 1-18 carbon atoms. Examples of such silanes are methyl-cyclohexyl-dimethoxy-silane, diphenyl-dimethoxy-silane, diisopropyldimethoxy-silane methyl-t-butyl-dimethoxy-silane and dicyclopentyl-dimethoxy-silane.

Non-Phenolic Stabilizers

The non-phenolic stabilizers in the propylene polymer compositions are selected from hindered amines, hydroxylamines, nitrones, amine oxides, benzofuranones, organic phosphites, phosphonites or mixtures thereof. Preferably, the non-phenolic stabilizers are selected from hindered amines, hydroxylamines, phosphites or mixtures thereof. The non-phenolic stabilizers are typically present in an amount ranging from about 0.001 to about 1 pph, preferably from about 0.005 to about 0.5 pph, and more preferably from about 0.01 to about 0.2 pph.

Processes for Producing the Irradiated Polymer Compositions

The propylene polymer compositions to be irradiated according to the present subject matter can be produced by a variety of processes, e.g., by combining the propylene polymer and the non-phenolic stabilizer in various processes well known to those skilled in the art, for example, by melt blending, dry blending, extrusion, and combinations thereof. Preferably the propylene polymer composition is formed by dry blending the propylene polymer with the non-phenolic stabilizer. More preferably, the propylene polymer composition is formed by first dry blending the propylene polymer and the non phenolic stabilizer, and then extruding the blended material. When the propylene polymer composition mixture is formed by a process that includes extrusion, the extrusion temperature is typically above the melting point of the polymer composition. The extrudate formed in the extruder is then subjected to an irradiation treatment as described below. During irradiation, the extrudate can be in the form of a solid, semi-solid or melt. Preferably, the extrudate is a solid, more preferably, the extrudate is in the form of a pellet.

The propylene polymer in the propylene polymer composition can also be treated with an organic peroxide in a visbreaking process to reduce its polydispersity index prior to irradiation. Preferably, the treatment occurs in an extruder or other mixing equipment, where the non-phenolic stabilizer is added to the propylene polymer at the inlet to the extruder or other mixing equipment, or to the partially extruded/mixed material, e.g., along the length of the extruder.

When the propylene polymer is visbroken prior to irradiation, the type of propylene polymer and non-phenolic stabilizer are as described above. Preferably, the polydispersity index of the propylene polymer material to be treated with the organic peroxide prior to irradiation is from greater than 3.4 to 22.5, more preferably from greater than 3.4 to 8.0, most preferably from greater than 3.4 to 5.0. Treatment of the propylene polymer is conducted by contacting the propylene polymer with an organic peroxide at temperatures of from 180° C. to 240° C.

The propylene polymer composition, whether visbroken or not, is irradiated in a reduced oxygen environment, where the total radiation dosage is preferably about 1 to about 20 Megarad, more preferably 2 to 15 Megarad, most preferably 3 to 9 Megarad. The reduced oxygen environment is maintained during irradiation. The expression "active oxygen" throughout this disclosure refers to oxygen in a form that will react with the propylene polymer composition, and more particularly to free radicals present in the propylene polymer composition, which are produced from the irradiation process. The expression "active oxygen" throughout this disclosure can include, but is not limited to, molecular oxygen, which is the form of oxygen normally found in air.

The expression "reduced oxygen environment" throughout this disclosure means an active oxygen concentration less than about 15% by volume, preferably less than 5% by volume, and more preferably less than 0.004% by volume, with respect to a total volume of the reduced oxygen environment. Most preferably, the reduced oxygen environment is an inert gas selected from nitrogen, argon, helium and krypton. Typically, the reduced oxygen environment is achieved by replacing part or all of the air in the environment in which the irradiation treatment is conducted by an inert gas, either under vacuum or at positive pressures.

The term "rad" is usually defined as a quantity of ionizing radiation that results in an absorption of 100 ergs of energy per gram of irradiated material, regardless of the source of radiation. With regard to the present subject matter, the amount of energy absorbed by the propylene polymer composition when it is irradiated usually is not determined. However, the process can be carried out such that the energy absorption from the ionizing radiation can be measured by a conventional dosimeter, which is a measuring device comprising a strip of fabric, film, or combination thereof, wherein the strip of fabric, film, or combination thereof comprises a radiation sensitive dye. This radiation sensitive dye can be used as an energy absorption sensing means. Accordingly, as used throughout this disclosure, the term "rad" means a quantity of ionizing radiation resulting in an absorption of the equivalent of 100 ergs of energy per gram of fabric, film, or combination thereof comprising the radiation sensitive dye of the dosimeter placed at a surface of the propylene polymer composition being irradiated, regardless of the form of the intermediate polyolefin resin at the time of irradiation.

The radiation from the irradiation treatment can be gamma radiation or electron beam radiation, with the radiation preferably being electron beam radiation. Radiation dosage and dosage rates are adjusted to form a substantial amount of chain scission within the propylene polymer composition, so as to achieve a desired change in melt strength while remaining below the gelation point. Typically, the propylene polymer composition is exposed to the requisite dosage of radiation for a time period ranging from about 0.0001 seconds to several days, the period of exposure being based on the desired total radiation dose, radiation dosage rate, and the type of radiation being used, such as gamma or electron beam. Radiation dosage rates are typically about 1 megarad to about 10,000 megarad per minute, preferably about 18 to about 2,000 megarads per minute.

The radiation should have sufficient energy to penetrate, to the extent desired, the extrudate of the propylene polymer composition, and preferably to excite the atomic structure of the propylene polymer composition, but preferably not sufficient energy to affect atomic nuclei within the intermediate polyolefin composition. Typically, the radiation is formed from electrons being beamed from an electron generator comprising an accelerating potential of 500-10,000 kilovolts.

After the propylene polymer composition has been exposed to the requisite dosage of radiation to form the irradiated propylene polymer composition, the irradiated propylene polymer composition is then maintained in the reduced oxygen environment, at temperatures of from 20° C. to 110° C. for a period of time sufficient for a significant amount of long chain branches to form within the irradiated propylene polymer material. A minimum amount of time is needed for sufficient migration of the propylene resin chain fragments formed by the irradiation, to free radical sites, where they can re-form to complete chains or otherwise form long branches on the polymer chains. Preferably, the irradiated propylene polymer composition is maintained in the reduced oxygen environment after exposure to the radiation for about one minute to up to about 48 hours, more preferably, for about one minute to about 24 hours, most preferably 90 minutes to 20 hours.

Following the irradiation treatment, the irradiated propylene polymer composition can be subjected to a quenching step while the irradiated propylene polymer composition is in the reduced oxygen environment to deactivate substantially all free radicals remaining in the irradiated propylene polymer composition. The quenching step includes raising the temperature of the irradiated propylene polymer composition while in the reduced oxygen environment to temperatures ranging from about 20° C. to about 200° C., more preferably from about 100° C. to about 150° C. Conventional free radical traps, such as methyl mercaptan, can optionally be used during the quenching step.

The irradiation step results in an increase in the melt tension of the irradiated propylene polymer composition. Typically, the melt tension of the irradiated material is greater than 0.5 cN, preferably greater than 1 cN, more preferably, 3.5 to 25 cN.

Additives, Stabilizers, and Fillers

The irradiated polymer compositions of the present subject matter can further comprise, in addition to the non-phenolic stabilizer, conventional additives and stabilizers well known in the art. In this regard, the irradiated polymer compositions of the present subject matter can additionally comprise at least one additive, stabilizer, filler, or combination thereof. Additives, stabilizers, and fillers can include, but are not limited to, UV absorbers, metal deactivators, thiosynergists, peroxide scavengers, basic co-stabilizers, acid scavengers, nucleating agents, clarifiers, conventional fillers, dispersing agents, plasticizers, lubricants, emulsifiers, pigments, rheology additives, catalysts, flow-control agents, optical brighteners, flame-proofing agents, antistatic agents, blowing agents, and mixtures thereof, which can be added in amounts well known to those skilled in the art. However, any additives, stabilizers, fillers, or the like, added to the propylene polymer composition, or after irradiation in the reduced oxygen environment, should not substantially negatively affect the improved melt tension of the irradiated polymer compositions described in the present subject matter. In particular, the total amount of any phenolic stabilizers are present in an amount of at most 500 ppm based on the propylene polymer, more preferably less than 100 ppm. Most preferably, the propylene polymer is free of phenolic stabilizers.

Peroxides for Visbreaking

Suitable organic peroxides include acyl peroxides, such as benzoyl and dibenzoyl peroxides; dialkyl and aralkyl peroxides, such as di-tert-butyl peroxide, dicumyl peroxide; cumyl butyl peroxide; 1,1,-di-tert-butylperoxy-3,5,5-trimethylcyclohexane; 2,5-dimethyl-1,2,5-tri-tert-butylperoxyhexane, and bis(alpha-tert-butylperoxy isopropylbenzene), and peroxy esters such as bis(alpha-tert-butylperoxy pivalate; tert-butylperbenzoate; 2,5-dimethylhexyl-2,5-di(perbenzoate); tert-butyl-di(perphthalate); tert-butylperoxy-2-ethylhexanoate, and 1,1-dimethyl-3-hydroxybutylperoxy-2-ethyl hexanoate, and peroxycarbonates such as di(2-ethylhexyl) peroxy dicarbonate, di(n-propyl)peroxy dicarbonate, and di(4-tert-butylcyclohexyl)peroxy dicarbonate or mixtures thereof. The peroxides can be used neat or in diluent medium, having an active concentration of from about 10% to about 100% by weight, preferably from 40 to 80% by weight, wherein the sum of the peroxide and the diluent medium is 100%.

Test Methods

Unless otherwise specified, the properties of the polymer materials and compositions that are set forth in the following examples have been determined according to the following test methods:

Melt Flow Rate ("MFR")

ASTM D1238, measured at 230° C., 2.16 kg, units of dg/min.

Melt Tension ("MT")

Melt tensions throughout this disclosure were measured on a Goettfert Rheotens apparatus at 200° C. The Rheoten apparatus consists of two counter-rotating wheels mounted on a balance beam. A melt strand of an irradiated polymer composition of the present subject matter is extruded from a capillary die and pulled between the counter-rotating wheels until the strand ruptures. The pulling velocity of the counter-rotating wheels is initially constant to establish a baseline of force, with a constant acceleration then applied to the strand until the strand ruptures. The maximum force measured before rupture during the test is taken as the melt tension. The extensibility of the melt is represented by the velocity at rupture.

Xylene Insolubles ("XI")

The weight percent of olefin polymer soluble in xylene at room temperature is determined by placing 2.5 g of polymer in 250 ml of xylene at room temperature in a vessel equipped with a stirrer, and heating at 135° C. with agitation for 20 minutes to dissolve the whole polymer. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached.

Polydispersity Index ("PI")

PI was determinated from the oscillatory shear test on a Rheometrics RDSII at 200° C. with a parallel plate test fixture. The typical frequency range is from 0.01 to 100 rad/sec. G' (storage modulus) and G" (loss modulus) are measured as a function of frequency (or shear rate). G' is normally less than G" at low frequency. As the frequency increases, G' grows faster than G" and eventually exceeds G". When G'=G", the modulus is called crossover modulus, or Gc. PI is defined as 1E6 divided by Gc (dyne/cm$^2$).

Crystallinity

The percent crystallinity (Xc) can be determined by differential scanning calorimetry according to the equation Xc=$\Delta$H/$\Delta$H°, where $\Delta$H is the experimentally observed enthalpy change on melting and $\Delta$H° is the enthalpy change on melting of 100% of the crystalline material.

EXAMPLES

The following examples are illustrative of preferred compositions and are not intended to be limitations thereon. All references to parts, percentages and ratios in this specification refer to percentages by weight of the final composition prepared, and unless otherwise indicated, all totals equal 100% by weight. Each of the polymer compositions in the examples contain the following additive package, unless otherwise specified: 0.05 parts per hundred ("pph") of Irgastab FS-042, 0.05 pph of Chimassorb 944, and 0.03 pph of calcium stearate ("CaSt"), based on the weight of the polymer material. All additves are commercially available from Ciba Specialty Chemicals.

Example 1

An isotactic polypropylene homopolymer having an MFR of 2.3 dg/min, PI of 3.3, XI of 99.5%, and degree of crystallinity of 53.3%, was prepared by first prepolymerizing a catalyst commercially available from Basell USA Inc. with propylene, where the yield of pre-polymerized catalyst was about 10-20 g/g-catalyst. The pre-polymerized catalyst and propylene were then continuously fed into a first loop reactor. The homopolymer formed in the first loop reactor and propylene were fed to a second reactor. The temperature of both loop reactors was between 70-71° C. The polymer was discharged from the second reactor, separated from the unreacted monomer and dried. The dried polymer was dry blended with an additive package and then extruded on a 1.25 inch Killion extruder commercially available from Davis-Standard/Killion at 210-220° C. at a screw speed of 100 rpm. The extruded pellets were placed in a reaction glass tube and the tube was purged with nitrogen for at least 15 minutes to ensure that the polymer was under an inert atmosphere for the radiation treatment. After purging, the reaction glass tube was closed and packed in ice. The polymer was then passed through the radiation beam for a total radiation dosage of 9 Mrad. After irradiation, the tube was placed in an oil bath set at 80° C. for 105 minutes and then placed in an oven maintained at 140° C. for 90 minutes. The pellets were then cooled to room temperature.

Example 2

An isotactic polypropylene homopolymer having an MFR of 11.1 dg/min, PI of 2.1, XI. of 99.7%, and degree of crystallinity of 48.6%, was prepared by first prepolymerizing a catalyst commercially available from Basell USA Inc. with propylene, where the yield of pre-polymerized catalyst was about 30-40 g/g-catalyst. The pre-polymerized catalyst and propylene were then continuously fed into a first loop reactor. The homopolymer formed in the first loop reactor and propylene was fed to a second reactor. The temperature of both loop reactors was 72° C. The polymer was discharged from the second reactor, separated from the unreacted monomer and dried. The dried polymer in the form of flake was blended with an additive package, extruded and irradiated according to the procedure of Example 1.

Example 3

The polymer of Example 3 was prepared according to the procedure of Example 2 except that the radiation dosage was 6 Mrad.

Example 4

The polymer of Example 4 was prepared according to the procedure of Example 2 except that the radiation dosage was 3 Mrad.

Control Example 5

A polypropylene homopolymer having an MFR of 12.5 dg/min, PI of 3.5, XI of 95.0%, and degree of crystallinity of 44.3%, commercially available from Basell USA Inc. was dry blended with an additive package, extruded and irradiated according to Example 1.

Control Example 6

The polymer of Control Example 6 was prepared according to the procedure of Control Example 5 except that the radiation dosage was 6 Mrad.

Control Example 7

The polymer of Control Example 7 was prepared according to the procedure of Control Example 5 except that it was irradiated at 3 Mrad.

The test results for Examples 1-4, and Control Examples 5-7 are set forth in Table 1.

TABLE 1

|  | PI prior to irradiation | MFR prior to irradiation (dg/min) | Dosage (Mrad) | Heat (° C.) | Quench Temperature (° C.) | MFR after irradiation (dg/min) | MT (cN) |
|---|---|---|---|---|---|---|---|
| Example 1 | 3.3 | 2.3 | 9 | 80 | 140 | 4.2 | 25 |
| Example 2 | 2.11 | 11.1 | 9 | 80 | 140 | 48 | 3.5 |
| Example 3 | 2.11 | 11.1 | 6 | 80 | 140 | 29 | 3.2 |
| Example 4 | 2.11 | 11.1 | 3 | 80 | 140 | 18 | 2.2 |
| Control Example 5 | 3.51 | 12.5 | 9 | 80 | 140 | 120 | <0.5 |
| Control Example 6 | 3.51 | 12.5 | 6 | 80 | 140 | 71 | <0.5 |
| Control Example 7 | 3.51 | 12.5 | 3 | 80 | 140 | 42 | <0.5 |

Example 8

An isotactic polypropylene homopolymer commercially available from Basell USA Inc. and having an MFR of 0.2, PI of 3.48, XI of 95.6, and crystallinity of 44.6%, was dry blended with additives as in Example 1. The blend was treated with Lupersol 101, an organic peroxide commercially available from Pennwalt Corporation, Lucidol Division, in a 1.25 inch Killion extruder at 210-220° C., with a screw speed of 100 rpm to achieve a PI of 3.34 and an MFR of 0.6. The extruder pellets were placed in a glass reaction tube and the tube was purged with nitrogen for at least 15 minutes to ensure that the polymer was under an inert atmosphere for the radiation treatment. After purging, the glass reaction tube was closed and packed in ice. The polymer was then passed through the radiation beam for a total radiation dosage of 9 Mrad. After irradiation, the tube was maintained at ambient temperature for about 16 hours and then maintained at 140° C. inside an oven for 90 minutes.

Example 9

The polymer of Example 9 was prepared according to the procedure of Example 8 except that the sample was treated with Lupersol 101 to achieve a PI of 2.72 and an MFR of 2.1.

Example 10

The polymer of Example 10 was prepared according to the procedure of Example 8 except that the sample was treated with Lupersol 101 to achieve a PI of 2.57 and an MFR of 4.0.

Control Example 11

An isotactic polypropylene homopolymer commercially available from Basell USA Inc. having an MFR of 0.65, PI of 3.83, XI of 95.6%, and crystallinity of 46.0% was dry blended with an additive package, extruded and irradiated according to the procedure of Example 1.

Control Example 12

An isotactic polypropylene homopolymer commercially available from Basell USA Inc. having an MFR of 1.72, PI of 3.76, XI of 95.6%, and crystallinity of 49.0% was dry blended with an additive package, extruded and irradiated according to the procedure of Example 1.

Control Example 13

A polypropylene homopolymer commercially available from Basell USA Inc. having an MFR of 4.9, PI of 3.79, XI of 95.3%, and crystallinity of 49.8% was dry blended with an additive package, extruded and irradiated according to the procedure of Example 1.

The test results for Examples 8-10, and Control Examples 11-13 are set forth in Table 2.

TABLE 2

| | PI prior to irradiation | MFR prior to irradiation (dg/min) | Dosage (Mrad) | Heat (° C.) | Quench (° C.) | MFR after irradiation (dg/min) | MT (cN) |
|---|---|---|---|---|---|---|---|
| Example 8 | 3.34 | 0.6 | 9 | 25 | 140 | 16 | 14 |
| Control Example 11 | 3.83 | 0.65 | 9 | 25 | 140 | 21 | 12 |
| Example 9 | 2.72 | 2.1 | 9 | 25 | 140 | 25 | 6.5 |
| Control Example 12 | 3.76 | 1.72 | 9 | 25 | 140 | 49 | 1 |
| Example 10 | 2.57 | 4 | 9 | 25 | 140 | 67 | 3.5 |
| Control Example 13 | 3.79 | 4.9 | 9 | 25 | 140 | 78 | <0.5 |

Example 14

Example 14 was prepared by adding a catalyst commercially available from Basell USA Inc. into a 1 gallon reactor. Triethylaluminum was then added to the reactor. After 15 minutes, ethylene and propylene were fed into the reactor, the reactor heated to 70° C. and the polymerization carried out for 2 hours. The resultant propylene-ethylene random copolymer had an ethylene content of 1.14 wt %, a MFR of 2.8 dg/min, an XI of 95.8 wt % and PI of 3.4. The polymer was blended with an additive package, extruded and irradiated according to the procedure of Example 1.

Control Example 15

Control Example 15 was prepared by polymerizing propylene and ethylene monomer in a gas-phase polymerization process as described in International Publication WO 97/04015, with a catalyst commercially available from Basell USA Inc. The polymerization was conducted at 85° C. and 2.9 MPa using triethylaluminium (TEAL) as co-catalyst (6 g/g-catalyst) and dicyclopentyldimethoxysilane as an external donor. The resultant propylene-ethylene random copolymer had an ethylene content of 3.0 wt %, a MFR of 3.0 dg/min, and a PI of 22.4. The polymer was blended with an additive package, extruded and irradiated according to the procedure of Example 1.

The test results for Example 14 and Control Example 15 are set forth in Table 3.

TABLE 3

| | PI prior to irradiation | MFR prior to irradiation (dg/min) | Dosage (Mrad) | Heat (° C.) | Quench (° C.) | MFR after irradiation (dg/min) | MT (cN) |
|---|---|---|---|---|---|---|---|
| Example 14 | 3.4 | 2.8 | 9 | 80 | 140 | 21 | 10 |
| Control Example 15 | 22.4 | 3.0 | 9 | 80 | 140 | 120 | 3 |

All incorporations by reference throughout this disclosure are done within the spirit and scope of the disclosure herein, and are not meant to limit the disclosure or scope of the following claims.

Additionally, the present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

We claim:

1. A process comprising:
   irradiating an extrudate comprising a propylene polymer composition with about 1 to about 20 Megarad of radiation to form an irradiated extrudate; the propylene polymer composition being irradiated in a reduced oxygen environment, wherein active oxygen is in an established and maintained concentration of less than about 15% by volume, with respect to a total volume of the reduced oxygen environment;
   maintaining the irradiated extrudate in the reduced oxygen environment for a period of time sufficient for a significant amount of long chain branches to form within the irradiated extrudate; and treating the irradiated extrudate while the irradiated extrudate is in the reduced oxygen environment to substantially deactivate free radicals present in the irradiated extrudate, wherein the propylene polymer composition comprises:
(A) a propylene polymer having a polydispersity index between 2.1 and 3.4; and
(B) 0.001 to 1 pph of a non-phenolic stabilizer selected from hindered amines, hydroxylamines, nitrones, amine oxides, benzofuranones, organic phosphites, phosphonites or mixtures thereof, based on the weight of the propylene polymer.

2. The process of claim 1 wherein the extrudate is irradiated with about 2 to about 15 Mrad of radiation.

3. The process of claim 2 wherein the extrudate is irradiated with about 3 to about 9 Mrad of radiation.

4. The process of claim 1 wherein the propylene polymer is selected from:
(a) a crystalline propylene homopolymer having a xylene insolubles greater than 80%,
(b) a crystalline random copolymer comprising propylene and an olefin selected from the group consisting of ethylene and a $C_4$-$C_{10}$ α-olefin, having xylene insolubles greater than 80%, with the proviso that when the α-olefin is ethylene, the crystalline random copolymer comprises a maximum polymerized ethylene content of about 10% by weight, and when the α-olefin is a $C_4$-$C_{10}$ α-olefin, the crystalline random copolymer comprises a maximum polymerized α-olefin content of about 20% by weight,
(c) a crystalline random terpolymer comprising propylene and two olefins selected from the group consisting of ethylene, $C_4$-$C_{10}$ α-olefins, and mixtures thereof with the proviso that the crystalline random terpolymer comprises a maximum polymerized $C_4$-$C_{10}$ α-olefin content of about 20% by weight, and when at least one of the α-olefins is ethylene, the crystalline random terpolymer comprises a maximum polymerized ethylene content of about 5% by weight,
(d) an olefin polymer composition comprising:
  (i) about 10 parts to about 60 parts by weight of a crystalline propylene homopolymer having xylene insolubles of at least 80%, or a crystalline copolymer selected from the group consisting of (a) propylene and ethylene, (b) propylene, ethylene and a $C_4$-$C_{10}$ α-olefin, and (c) propylene and a $C_4$-$C_{10}$ α-olefin, the crystalline copolymer comprising a propylene content of more than about 85% by weight, and xylene insolubles greater than about 60%;
  (ii) about 3 parts to about 25 parts by weight of a copolymer of ethylene and propylene, or ethylene and a $C_4$-$C_{10}$ α-olefin, wherein the copolymer is insoluble in xylene at ambient temperature; and
  (iii) about 10 parts to about 80 parts by weight of an elastomeric copolymer selected from the group consisting of (a) ethylene and propylene, (b) ethylene, propylene, and a $C_4$-$C_{10}$ α-olefin, and (c) ethylene and a $C_4$-$C_{10}$ α-olefin, the elastomeric copolymer optionally comprising about 0.5% to about 10% by weight of a diene, and comprising less than 70% by weight of ethylene, wherein the elastomeric copolymer is soluble in xylene at ambient temperature and comprises an intrinsic viscosity of about 1.5 to about 4.0 dl/g;
  wherein (ii) and (iii) total about 50% to about 90% by weight based on a total weight of the olefin polymer composition, and (ii)/(iii) comprise a weight ratio of less than 0.4; the olefin polymer composition being prepared by polymerization in at least two stages,
(e) a thermoplastic olefin comprising:
  (i) about 10% to about 60% by weight of a propylene homopolymer having xylene insolubles of at least 80%, or a crystalline copolymer selected from the group consisting of (a) ethylene and propylene, (b) ethylene, propylene and a $C_4$-$C_{10}$ α-olefin, and (c) ethylene and a $C_4$-$C_{10}$ α-olefin, the crystalline copolymer comprising a propylene content greater than 85% by weight and an isotactic index of greater than 60%;
  (ii) about 20% to about 60% by weight of an amorphous copolymer selected from the group consisting of (a) ethylene and propylene, (b) ethylene, propylene, and a $C_4$-$C_{10}$ α-olefin, and (c) ethylene and an α-olefin, the amorphous copolymer comprising less than 70% by weight of ethylene and is soluble in xylene at ambient temperature, the amorphous copolymer optionally comprising about 0.5% to about 10% by weight of a diene; and
  (iii) about 3% to about 40% by weight of a copolymer of ethylene and propylene or a copolymer of ethylene and an α-olefin, wherein the copolymer is insoluble in xylene at ambient temperature, or
(f) mixtures thereof.

5. The process of claim 4 wherein the propylene polymer is selected from crystalline propylene homopolymers, crystalline random copolymers comprising propylene and an olefin selected from ethylene, $C_4$-$C_{10}$ α-olefins or mixtures thereof.

6. The process of claim 1 wherein the non-phenolic stabilizer is selected from hindered amines, hydrolyamines, phosphites or mixtures thereof.

7. The process of claim 1 wherein the non-phenolic stabilizer is present in an amount from about 0.005 to about 0.5 pph.

8. An irradiated extrudate produced by the process of claim 1.

9. A process comprising:
treating a propylene polymer composition with an organic peroxide to form a visbroken product having a polydispersity index between 2.1 and 3.4, the propylene polymer composition comprising:
(A) a propylene polymer; and optionally
(B) 0.001 to 1 pph of a non-phenolic stabilizer selected from hindered amines, hydroxylamines, nitrones, amine oxides, benzofuranones, organic phosphites, phosphonites or mixtures thereof, based on the weight of the propylene polymer;
irradiating the visbroken product with about 1 to about 20 Megarad of radiation to form an irradiated, visbroken product; the visbroken product being irradiated in a reduced oxygen environment, wherein active oxygen is in an established and maintained concentration of less than about 15% by volume, with respect to a total volume of the reduced oxygen environment;
maintaining the irradiated, visbroken product in the reduced oxygen environment for a period of time sufficient for a significant amount of long chain branches to form within the irradiated, visbroken product; and
treating the irradiated, visbroken product while the irradiated, visbroken product is in the reduced oxygen environment to substantially deactivate free radicals present in the irradiated, visbroken product.

10. The process of claim 9 wherein the irradiated, visbroken product is in the form of an extrudate.

11. The process of claim 9 wherein the visbroken product is irradiated with about 2 to about 15 Mrad of radiation.

12. The process of claim 11 wherein the visbroken product is irradiated with about 3 to about 9 Mrad of radiation.

13. The process of claim 9 wherein the propylene polymer is selected from:
   (a) a crystalline propylene homopolymer having a xylene insolubles greater than 80%,
   (b) a crystalline random copolymer comprising propylene and an olefin selected from the group consisting of ethylene and a $C_4$-$C_{10}$ α-olefin, having xylene insolubles greater than 80%, with the proviso that when the α-olefin is ethylene, the crystalline random copolymer comprises a maximum polymerized ethylene content of about 10% by weight, and when the α-olefin is a $C_4$-$C_{10}$ α-olefin, the crystalline random copolymer comprises a maximum polymerized α-olefin content of about 20% by weight,
   (c) a crystalline random terpolymer comprising propylene and two olefins selected from ethylene, $C_4$-$C_{10}$ α-olefins, or mixtures thereof with the proviso that the crystalline random terpolymer comprises a maximum polymerized $C_4$-$C_{10}$ α-olefin content of about 20% by weight, and when at least one of the α-olefins is ethylene, the crystalline random terpolymer comprises a maximum polymerized ethylene content of about 5% by weight,
   (d) an olefin polymer composition comprising:
      (i) about 10 parts to about 60 parts by weight of a crystalline propylene homopolymer having xylene insolubles of at least 80%, or a crystalline copolymer selected from the group consisting of (a) propylene and ethylene, (b) propylene, ethylene and a $C_4$-$C_{10}$ α-olefin, and (c) propylene and a $C_4$-$C_{10}$ α-olefin, the crystalline copolymer comprising a propylene content of more than about 85% by weight, and xylene insolubles greater than about 60%;
      (ii) about 3 parts to about 25 parts by weight of a copolymer of ethylene and propylene, or ethylene and a $C_4$-$C_{10}$ α-olefin, wherein the copolymer is insoluble in xylene at ambient temperature; and
      (iii) about 10 parts to about 80 parts by weight of an elastomeric copolymer selected from the group consisting of (a) ethylene and propylene, (b) ethylene, propylene, and a $C_4$-$C_{10}$ α-olefin, and (c) ethylene and a $C_4$-$C_{10}$ α-olefin, the elastomeric copolymer optionally comprising about 0.5% to about 10% by weight of a diene, and comprising less than 70% by weight of ethylene, wherein the elastomeric copolymer is soluble in xylene at ambient temperature and comprises an intrinsic viscosity of about 1.5 to about 4.0 dl/g;
   wherein (ii) and (iii) total about 50% to about 90% by weight based on a total weight of the olefin polymer composition, and (ii)/(iii) comprise a weight ratio of less than 0.4; the olefin polymer composition being prepared by polymerization in at least two stages,
   (e) a thermoplastic olefin comprising:
      (i) about 10% to about 60% by weight of a propylene homopolymer having xylene insolubles of at least 80%, or a crystalline copolymer selected from the group consisting of (a) ethylene and propylene, (b) ethylene, propylene and a $C_4$-$C_{10}$ α-olefin, and (c) ethylene and a $C_4$-$C_{10}$ α-olefin, the crystalline copolymer comprising a propylene content greater than 85% by weight and xylene insolubles greater than 60%;
      (ii) about 20% to about 60% by weight of an amorphous copolymer selected from the group consisting of (a) ethylene and propylene, (b) ethylene, propylene, and a $C_4$-$C_{10}$ α-olefin, and (c) ethylene and an α-olefin, the amorphous copolymer comprising less than 70% by weight of ethylene and is soluble in xylene at ambient temperature, the amorphous copolymer optionally comprising about 0.5% to about 10% by weight of a diene; and
      (iii) about 3% to about 40% by weight of a copolymer of ethylene and propylene or a copolymer of ethylene and an α-olefin, wherein the copolymer is insoluble in xylene at ambient temperature, or
   (f) mixtures thereof.

14. The process of claim 13 wherein the propylene polymer is selected from crystalline propylene homopolymers, crystalline random copolymers comprising propylene and an olefin selected from ethylene, $C_4$-$C_{10}$ α-olefins or mixtures thereof.

15. The process of claim 9 wherein the non-phenolic stabilizer is selected from hindered amines, hydrolyamines, phosphites or mixtures thereof.

16. The process of claim 9 wherein the non-phenolic stabilizer is present in an amount from about 0.005 to about 0.5 pph.

17. A visbroken, irradiated product formed by the process of claim 9.

* * * * *